US009122058B2

(12) United States Patent
Hall

(10) Patent No.: US 9,122,058 B2
(45) Date of Patent: *Sep. 1, 2015

(54) LIGHT GUIDING DEVICE

(71) Applicant: Thermoteknix Systems Limited, Cambridgeshire (GB)

(72) Inventor: Peter Hall, Cambridgeshire (GB)

(73) Assignee: THERMOTEKNIX SYSTEMS LIMITED, Cambridgeshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/756,618

(22) Filed: Feb. 1, 2013

(65) Prior Publication Data

US 2013/0141793 A1    Jun. 6, 2013

Related U.S. Application Data

(63) Continuation of application No. 12/851,799, filed on Aug. 6, 2010, now Pat. No. 8,390,807.

(30) Foreign Application Priority Data

Aug. 7, 2009 (GB) .................................... 0913818.1

(51) Int. Cl.
*G02B 23/12* (2006.01)
*G02B 27/10* (2006.01)
*G02B 6/00* (2006.01)

(52) U.S. Cl.
CPC *G02B 27/10* (2013.01); *G02B 6/00* (2013.01); *G02B 23/12* (2013.01)

(58) Field of Classification Search
CPC ............................. G02B 23/12; G02B 23/125
USPC .................................................. 359/350–361
See application file for complete search history.

(56) References Cited

U.S. PATENT DOCUMENTS

| 4,626,905 | A | * | 12/1986 | Schmidt .......................... 348/36 |
| 5,653,034 | A | * | 8/1997 | Bindon ........................... 42/131 |
| 5,680,209 | A | * | 10/1997 | Machler ......................... 356/319 |
| 5,748,825 | A |   | 5/1998 | Rockwell, III |

(Continued)

FOREIGN PATENT DOCUMENTS

JP            7035611 A       2/1995

*Primary Examiner* — Thomas K Pham
*Assistant Examiner* — Cara Rakowski
(74) *Attorney, Agent, or Firm* — Barlow, Josephs & Holmes, Ltd.

(57) ABSTRACT

A light guiding device is operable to receive incident light emitted by a light source through a capture surface. The received light exits the light guiding device through an exit surface provided adjacent to and aligned with an aperture of light receiver. In this manner, light from the light source can be inserted into the receiver where it may be combined with additional incident light captured by the receiver. The light source might be a projector and the light projected may correspond to operational data relating to the operation of the receiver or images corresponding to data captured by a further receiver device operating with a different form of sensor or in a different region of the spectrum. In order to improve the composite image observed by a user of the light receiving device, the operation of the light source can be controlled to vary the intensity of the light emitted. In one example, this variation can be in response to the ambient light level, as sensed by a suitable sensor. An additional or alternative variation is to vary the intensity in a pulsed manner between a peak and a low level.

12 Claims, 3 Drawing Sheets

(56) References Cited

U.S. PATENT DOCUMENTS

| | | |
|---|---|---|
| 5,809,053 A | 9/1998 | Nakatsuka et al. |
| 5,829,858 A | 11/1998 | Levis et al. |
| 6,230,057 B1 | 5/2001 | Chow et al. |
| 6,318,863 B1 | 11/2001 | Tiao et al. |
| 6,501,542 B2 | 12/2002 | Jung et al. |
| 7,182,495 B2 | 2/2007 | Cianciotto et al. |
| 2004/0081423 A1 | 4/2004 | Galarza |
| 2004/0082981 A1 | 4/2004 | Chow et al. |
| 2004/0130795 A1* | 7/2004 | Shimizu ............... 359/627 |
| 2006/0061870 A1* | 3/2006 | Wang ................... 359/627 |
| 2008/0137181 A1* | 6/2008 | That et al. ............. 359/350 |
| 2008/0302966 A1 | 12/2008 | Reed et al. |

* cited by examiner

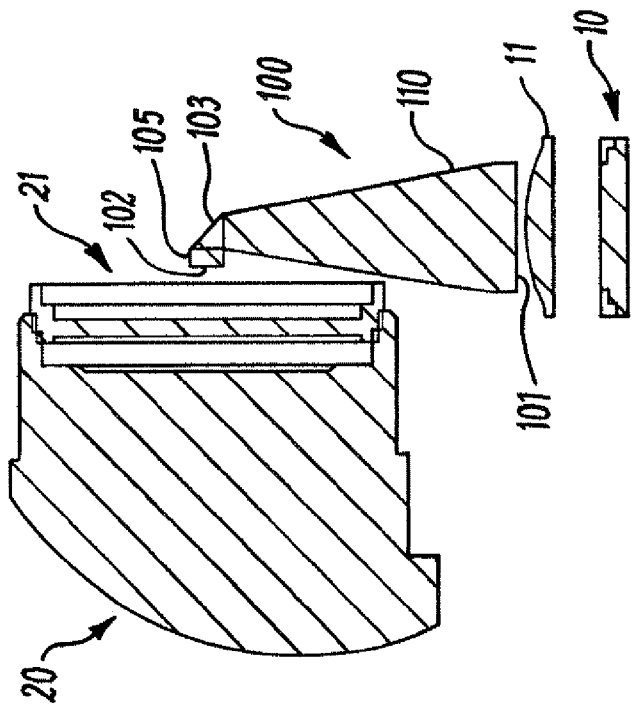
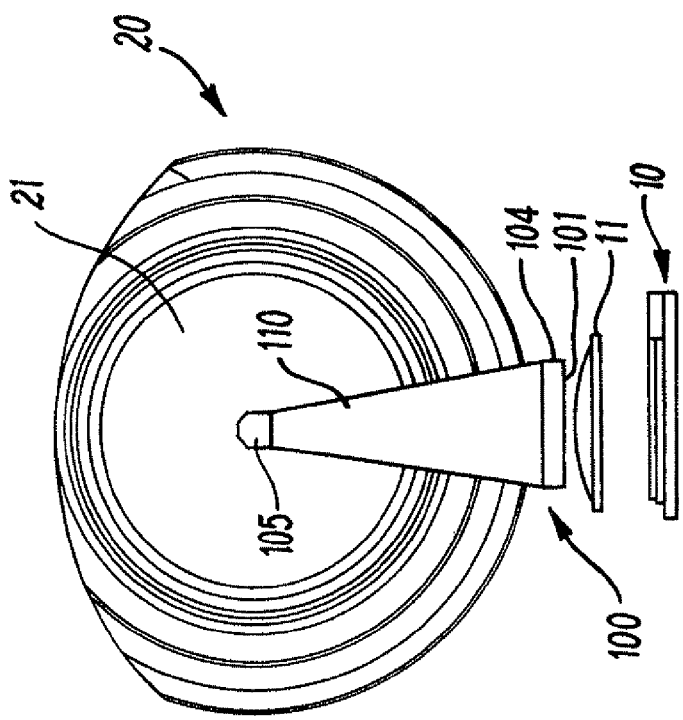

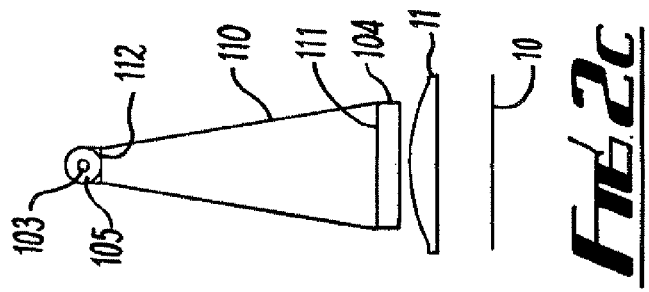
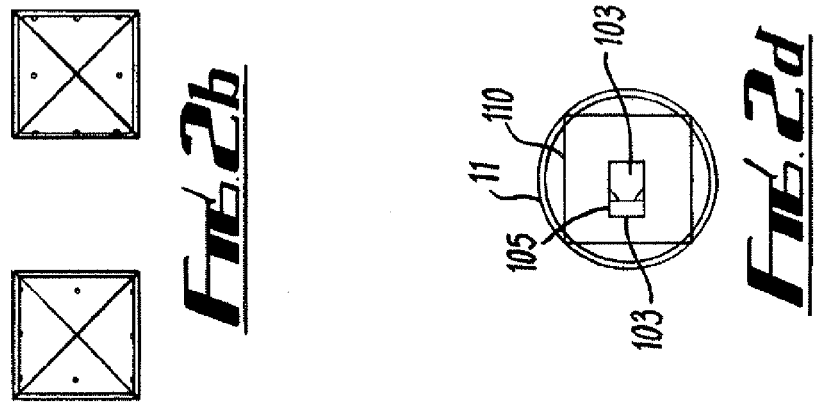
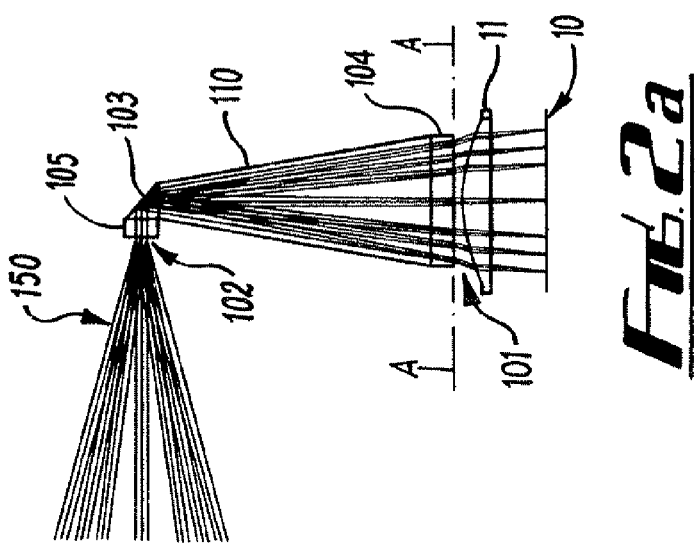

LIGHT GUIDING DEVICE

CROSS-REFERENCE TO RELATED APPLICATIONS

The present patent document is a continuation of earlier filed U.S. Application Ser. No. 12/851,799, filed on Aug. 6, 2010, which claims priority to earlier filed United Kingdom Application Serial No. 0913818.1, filed on Aug. 7, 2009, the entire contents of which are incorporated herein by reference.

BACKGROUND OF THE INVENTION

1. Field of the Invention

The present invention relates to a light guiding device and in particular to a light guiding device operable to enable the combination of light from two separate sources into a single image.

2. Background of the Related Art

In certain circumstances it may be desirable to combine image information from two or more sources to provide a composite image. One such occasion is where it is desirable to provide text data (such as range or similar) over an image. Another such occasion is where it may be desirable to combine image data from an image intensifier ($I^2$) with image data obtained from a thermal imager. An image intensifier amplifies visible light and near infra red light (say 400 nm-900 nm in wavelength); whilst a thermal imager operates in a further portion of the infra red light spectrum (say 7000 nm-14000 nm in wavelength). This is advantageous as the longer wavelengths are generally less attenuated by smoke and dust, although image intensifiers generally have better resolution than thermal imagers.

Current night vision systems using image intensification benefit from higher resolution and more natural imaging in comparison to imaging in the far infrared. However, $I^2$ systems are limited in so far as they do need at least some ambient light to operate. A typical intensifier tube becomes noise limited at around 100 μlux which corresponds to a moonless overcast night sky. At this point and at lower light levels effective night vision requires infrared systems.

Thermal imaging also offers advantages over $I^2$ in detecting targets concealed by camouflage. Addressing $I^2$ limitations by including a thermal imaging capability improves overall night vision performance but at the expense of complexity and weight. Hand held systems are easy to interchange when each system is self contained with its own optics, display and power supply. On the other hand helmet or system mounted image intensifiers cannot be easily swapped over.

An example of an apparatus that provides this image combination is disclosed in US2008/0302966. In this system, a conventional image intensifier is provided with a clip on attachment comprising a thermal imager, a projector operable to project a visible image captured by the thermal imager and a light guiding device which directs light emitted by the projector into the aperture of the image intensifier. In this manner image from the thermal imager and the image intensifier may be combined to provide a single image.

The light guiding device comprises a reflector such as a prism, mirror, or similar provided within an opaque housing. The housing has a two fold purpose, both to provide sufficient structural integrity to hold the reflector in position and to shield the reflector from unwanted incident light. In order to provide optimal injection performance, the reflector is aligned with the optical axis of the image intensifier. The housing thus provides a significant obstruction to the field of view of the image intensifier. This can not only limit what can be seen by a user in terms of field of view but additionally may reduce the sensitivity of the image intensifier as it allows less visible light to enter the intensifier tube. Accordingly, the design of the opaque housing is a trade off between providing sufficient structural stability and minimising obstruction to other devices.

An additional problem with such systems is that the light emitted by the projector may be of sufficient intensity to swamp the captured light or that it is not clear what parts of the image are captured and what parts are a result of the projected light. In order to reduce this effect, the intensity of the projector can be adjusted manually. Whilst this does provide a solution to these problems, it is not optimal.

It is therefore an object of the present invention to provide an optical device that at least partially overcomes or alleviates the above problems.

SUMMARY OF THE INVENTION

According to a first aspect of the present invention there is provided a light guiding device suitable for receiving incident light travelling in a first direction and transmitting it onwards in a second different direction, the light guiding device comprising: an elongate light transmitting solid body, the body tapering from a wider end to a narrower end, the wider end adapted to provide a receiving surface for receiving incident light travelling in the first direction and the narrower end adapted to provide an exit surface for said incident light; and a reflector provided adjacent to the narrower end, the reflector adapted to receive said incident light from the exit surface and reflect said incident light away from the device in the second direction.

By providing an elongate solid body between the capture surface and the reflector, the need for structural integrity to be provided by an opaque housing is avoided. This can therefore reduce the overall thickness of such a device for a selected capture surface, whilst also providing improved structural integrity. Accordingly, if used to direct light from a source into the capture aperture of an optical sensing device, the light guiding device of the present invention would provide reduced obstruction of the field of view of the optical sensing device. For the avoidance of doubt, in the text herein below the terms 'light' and 'optical' are intended to refer to electromagnetic radiation, particularly in the visible part of the spectrum but also in the infra red or ultraviolet parts of the spectrum, if appropriate or desired.

The solid body is preferably formed from a material having a high refractive index, say, greater than 1.5 and most preferably greater than 1.7. The high refractive index helps to refract light incident upon the capture surface towards the elongate axis of the body. The material forming the solid body is preferably sufficiently robust to provide structural integrity for the device. Preferably the material is sufficiently robust to provide structural integrity when handled roughly or when subject to impact. Non-limiting examples of materials having a suitably high refractive index and sufficient robustness would include sapphire, YAG (Yttrium Aluminium Garnet) or a spinel. For the avoidance of doubt, the term spinel is used to encompass the spinel group of minerals of general formulation $A^{2+}B_2^{3+}O_4^{2-}$ which crystallise in the cubic (isometric) crystal system, with the oxide anions arranged in a cubic close-packed lattice and the cations A and B occupying some or all of the octahedral and tetrahedral sites in the lattice. Preferably, the selected spinel is substantially transparent to radiation in a range of the spectrum for which the device is to be used.

Using such materials in place of glass enables a lighter, smaller and stronger guiding device to be provided. Additionally, due to the additional strength of such materials compared to glass, means that a coating can replace a load bearing housing structure. This can save further weight and bulk.

The tapering angle of the solid body may be selected based upon the refractive index of the solid body.

The solid body preferably has a regularly shaped cross section. In particular, the solid body may have a substantially rectangular, square or circular shaped cross-section. If used in conjunction with a projector screen the solid body preferably has a cross-section corresponding to the shape of the projector screen. The ends of the solid body may comprise planar faces. In particular, the ends of the solid body may comprise planar faces substantially perpendicular to the elongate axis of the solid body.

The reflector may comprise a prism, mirror, corner cube, beam splitter or other folding optical element. In the event that the reflector is a prism it may be formed from the same material as the solid body or from a material having a substantially similar refractive index. The reflector is preferably adapted to deflect light travelling parallel to the elongate axis of the body though substantially 90°. In alternative embodiments, alternative deflection angles may be used, if desired.

In some embodiments, the reflector may be integral with the solid body. In such embodiments, the reflector may comprise a planar face provided at the narrow end of the solid body and inclined at a suitable inclination to the elongate axis of the solid body. In other embodiments, the reflector may be provided adjacent to a perpendicular end face of the solid body. Preferably, the reflector is provided directly adjacent to the end face of the solid body, leaving no gap therebetween. By having a construction without a gap between the reflector and the body the structural integrity of the light guiding device can be improved. Additionally, this can render a load bearing mounting means unnecessary further reducing weight and bulk. In a preferred version of such an embodiment, the reflector may form a prism one face of which is provided adjacent and substantially parallel to a perpendicular end face of the solid body.

The reflector may be secured in position using a suitable mounting means. The mounting means may comprise an optical adhesive or may comprise a spacer mount. The spacer mount may incorporate one or more suitable lenses to focus light, if desired. The spacer mount may comprise a solid optically transparent block or may comprise a rigid fitting attached to the outer edges of the solid body and reflector. In such cases the rigid fitting may provide a gap between the solid body and the reflector. The provision of a gap can improve the MTF (modulation transfer function) of the device at the expense of some of its structural integrity. The rigid fitting may be in the form of a suitably adapted sleeve. In particular, the sleeve may be formed of steel or other suitable material. Use of a rigid fitting of this sort may also reduce unwanted smearing of adhesive onto the reflector and/or the end face of the solid body.

The capture surface and/or the exit surface may be provided with one or more lenses adjacent thereto. The lenses may focus the captured/exiting light as desired. The capture surface and/or the exit surface may be adapted to block some stray light paths. Whilst this adds a degree of vignetting to the device, it can reduce the size and weight of the device. The capture surface and/or the exit surface may be provided with a protective raised rim. This can provide a measure of protection from physical impacts and/or provide a block for stray light paths. The raised rim may be provided as part of a mounting means for mounting lenses adjacent thereto. The mounting means may be a rigid fitting or may be in the form of a suitably adapted sleeve. In particular, the sleeve may be formed of steel or other suitable material.

At least the sides of the solid body may be covered by an opaque layer. This can shield the reflector from unwanted incident light. The opaque layer may be formed from any opaque substance. In some embodiments, some of or all of the opaque layer may comprise a suitable paint applied to the solid body. In alternative embodiments, some of or all of the opaque layer may comprise a plastic or in particular a rubberised plastic layer applied to the solid body. Such a layer may provide some measure of protection for the device and/or for any other objects or equipment that come into contact with the device. In other embodiments, the coating layer may form, incorporate and/or be applied over any one of mounting means, raised rims, rigid fittings, sleeves, housing or any other structural elements of the device.

The light guiding device may be adapted to capture light from a light source, which may be a lens, prism or mirror arrangement, or a light emitter, such as a projector or similar. The capture surface is preferably provided adjacent to or aligned with the light source. To facilitate such positioning, the end faces of the solid body may be angled away from the elongate axis of the solid body.

The light guiding device may additionally or alternatively be adapted to direct exit light into a light receiver, which may be an aperture of a lens, prism or mirror arrangement or a sensing device such as an image intensifier, imaging array or similar. The exit surface is preferably provided adjacent to or aligned with the aperture of the light receiver. Most preferably, the exit surface is provided adjacent to or aligned with the centre aperture of the light receiver. By aligning the exit surface with the centre aperture of the light receiver vignetting of the transmitted light can be reduced or substantially eliminated.

A suitable bracket or connection element may be utilised to position the light guiding device as required in relation to a light source or light receiver. The bracket or connection element may be a separate element or may be integrated into the light guiding device, the light source or light receiver as desired or as appropriate. In some embodiments, the capture surface may be provided with attachment means to facilitate attachment to the light source. Additionally or alternatively, the exit surface may be provided with attachment means to facilitate attachment to the light receiver.

In a preferred embodiment, the light source is a projector comprising a display unit of any suitable form. In particular, the display unit may be an LCD (liquid crystal display) or LED (light emitting diode) display unit. In a particularly preferable embodiment the display unit is comprised of an array of OLEDs (Organic LEDs). The projector may be provided with a lens to focus the projected image.

The projector may be controlled by electrical, optical or RF signals from a separate component or device. In particular, the projector may be operable to display any one or more of: text (including alphanumeric characters and symbols), icons, or images.

Preferably, the optical guiding device is used to direct light from the projector into the aperture of a suitable light receiver. This can facilitate the light receiver capturing a composite image incorporating the light emitted by the projector and the light captured separately by the light receiver. In such embodiments, the projector may be adapted to project an image captured by another imaging device. The other device may be a device adapted to capture an image in a different wavelength range. In this manner, the light guiding device may be used to generate composite images over an extended wavelength range. In one embodiment, the other imaging device may be operable to capture an infrared image.

In some embodiments, the intensity of light emitted by the projector may be variable. Varying the intensity of the light source emissions can reduce the possibility of the light source output swamping the light captured by the light receiver. This can help to ensure that data from both the light source and the other light captured by the light receiver is clearly discernable by a user. Additionally or alternatively, it can help to differentiate between the light source output and light captured by the light receiver.

The variation may be automatically controlled by a suitable control unit in response to predetermined criteria. This frees a user of the device from attending to this control thus making the device easier to use and more likely to select an optimum intensity level. However, if desired, a user operable intensity control may also be provided. The control unit may be a microprocessor. The predetermined criteria may be related to a sensor input and/or to a timer input.

In the case of a sensor input, the sensor may be any suitable form of sensor. In particular the sensor may be operable to sense light of any suitable frequency. Most particularly, the sensor may be operable to sense ambient exterior light levels or ambient light levels captured by the light receiver. For example, in the case where the light receiving device is an image intensifier, the present gain setting of the image intensifier can be sensed to provide an indication of the ambient light levels. In this manner, the control unit may reduce the projector intensity in response to low ambient light levels.

In the case of a timer input, the light intensity may be varied by being pulsed. The pulses can have any suitable form and any suitable frequency. In a preferred example, the pulses rise rapidly to a maximum intensity, fall gradually to zero or a low level and hold at zero or at a low level for a suitable time period. In another preferred example, the fall time and the low time of the pulses may be of the order of a few seconds, say 3 seconds. In this manner, a human observer can readily identify that part of a composite image that is provided by projected light.

In one embodiment, the light receiver may be an image intensifier. In another embodiment, the light receiver may be a magnifying device or other device utilising the optical capture of visible light. The light guiding device is advantageous for any existing optical system such as a telescope, camera, imager or intensifier where additional textual data or image data must be injected with minimum interference with the optical system's field of view. In yet another embodiment a laser rangefinder may be clipped to the side of a camera where the range textual information is injected without overly interfering with the camera's field of view.

According to a second aspect of the present invention there is provided an optical data insertion device suitable for optically inserting additional data into a light receiver of the type having means operable to capture an incident light and focus it or output a signal indicative thereof, the optical data insertion device comprising: a light guiding device in accordance with the first aspect of the present invention, the light guiding device adapted such that its exit surface is positioned adjacent to or in alignment with an aperture of the light receiver; and a light source, operable to emit light corresponding to the additional optical data for insertion, the light source positioned adjacent to or in alignment with the capture surface of the light guiding device.

The optical data insertion device of the second aspect of the present invention may incorporate any or all features of the light guiding device of the first aspect of the present invention as desired or as appropriate.

According to a third aspect of the present invention there is provided a thermal imaging attachment for an image intensifier comprising: a thermal imaging device operable to capture an image and output a signal indicative thereof; a light guiding device in accordance with the first aspect of the present invention, the light guiding device fixable such that its exit surface is positioned adjacent to or in alignment with the aperture of the image intensifier; and a projector operable in response to the signal output by the thermal imaging device to emit light indicative thereof, the projector fixable such that it is positioned adjacent to or in alignment with the capture surface of the light guiding device.

The attachment of the third aspect of the present invention may incorporate any or all features of the light guiding device of the first aspect of the present invention or the optical data insertion device of the second aspect of the present invention as desired or as appropriate.

According to a fourth aspect of the present invention there is provided an optical data insertion device suitable for optically inserting additional data into a light receiver of the type having means operable to capture an incident light and focus it or output a signal indicative thereof, the optical data insertion device comprising: a light source operable to emit light corresponding to the additional optical data; and a light guiding device for receiving light from the light source and directing it to the light receiver; and a control unit operable to vary the overall intensity of the light emitted by the light source in response to predefined criteria.

Varying the intensity of the light source emissions can reduce the possibility of the light source output swamping the light captured by the light receiver. Additionally or alternatively, it can help to differentiate between the light source output and light captured by the light receiver.

The control unit may be a microprocessor. The predetermined criteria may be related to a sensor input and/or to a timer input.

In the case of a sensor input, the sensor may be any suitable form of sensor. In particular the sensor may be operable to sense light of any suitable frequency. Most particularly, the sensor may be operable to sense ambient exterior light levels or ambient light levels captured by the light receiver. Additionally or alternatively, the sensor may be operable to sense the present gain setting of the light receiving device as an indication of ambient light level. In this manner, the control unit may reduce the projector intensity in response to low ambient light levels.

In the case of a timer input, the light intensity may be varied by being pulsed. The pulses can have any suitable form and any suitable frequency. In a preferred example, the pulses rise rapidly to a maximum intensity, fall gradually to zero or a low level and hold at a low level for a suitable time period. In another preferred example, the fall time and the low time of the pulses may be of the order of a few seconds, say 3 seconds. In this manner, a human observer can readily identify that part of a composite image that is provided by projected light.

The light source may be any suitable light source, including any suitable light source mentioned in connection with the first, second or third aspects of the present invention or incorporating any features described in relation to the first, second or third aspects of the present invention. The light receiver may be any suitable light receiver, including any suitable light receiver mentioned in connection with the first, second or third aspects of the present invention or incorporating any features described in relation to the first, second or third aspects of the present invention. The light guiding device may be any suitable light guiding device, including any suitable light guiding device of the prior art or mentioned in connection with the first, second or third aspects of the present invention or incorporating any features described in relation to the first, second or third aspects of the present invention.

According to a fifth aspect of the present invention there is provided a method of optically inserting additional data into a light receiver from a light source using an optical data insertion device of the type having a light source operable to emit light corresponding to the additional optical data; and a light guiding device for receiving light from the light source and directing it to the light receiver, the method comprising the step of pulsing the light emitted by the light source.

According to a sixth aspect of the present invention there is provided a method of optically inserting additional data into a light receiver from a light source using an optical data insertion device of the type having a light source operable to emit light corresponding to the additional optical data; and a light guiding device for receiving light from the light source and directing it to the light receiver, the method comprising the steps of varying the intensity of the emitted light in response to a sensed ambient light level.

The methods of the fifth and sixth aspects of the present invention may incorporate any or all of the features of the earlier aspects of the present invention, as desired or as appropriate.

BRIEF DESCRIPTION OF THE DRAWINGS

In order that the invention may be clearly understood, exemplary embodiments will now be described further below, by way of example only, and with reference to the accompanying drawings in which:

FIG. 1a is a schematic view of a light guiding device according to the present invention utilised for inserting optical data emitted by a projector into the aperture of a light receiver;

FIG. 1b is a cross-sectional side view of the schematic of FIG. 1a;

FIG. 2a is a schematic view of a first embodiment of a light guiding device according to the present invention illustrating example ray paths;

FIG. 2b shows the foot prints of ray paths that define the edges of a rectangular projector at different orientations with respect to the cross-section of the light guiding device body of FIG. 2a;

FIG. 2c shows a schematic front view of the light guiding device of FIG. 2a;

FIG. 2d shows a schematic plan view of the light guiding device of FIG. 2a;

FIG. 3b shows the foot prints of ray paths that define the edges of a rectangular projector with respect to the cross-section of the light guiding device body of FIGS. 3a; and FIG. 3c shows a schematic front view of the upper portion of the light guiding device of FIG. 3a.

DESCRIPTION OF THE PREFERRED EMBODIMENTS

Figure 3B:
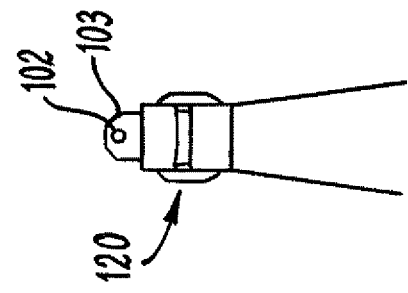

Turning now to FIGS. 1a and 1b, a light guiding device 100 is operable to receive incident light emitted by a light source 10 through a capture surface 101. This light can be focussed by an optional lens 11, which may be integral to the light source 10 or the light guiding device 100. The received light exits the light guiding device 100 through an exit surface 102 provided adjacent to and aligned with an aperture 21 of light receiver 20. In this manner, light from the light source 10 can be inserted into the receiver 20 where it may be combined with additional incident light captured by the receiver 20. Typically, the light source 10 might be a projector and the light projected may correspond to operational data relating to the operation of the receiver 20 or images corresponding to data captured by a further receiver device operating with a different form of sensor or in a different region of the spectrum.

In one more specific example the light guiding device 100 is used to provide thermal imaging capability for an image intensifier sight 20. The image intensifier sight 20 comprises an aperture 21 though which incident light can be captured. The captured light is amplified and may be viewed through an eyepiece (not shown). The thermal imaging attachment comprises a thermal imaging camera (not shown) capturing incident infra red light and outputting images indicative thereof. The captured images are fed to a projector 10 for projection into the image intensifier 20 by light guiding device 100. In this manner, a user can see a composite image of captured radiation in the visible and infra red ranges.

As was discussed above in the background, the prior art light guiding devices tended to lack structural integrity or to obstruct a large portion of the aperture or possibly both. Turning now to FIGS. 2a-2d, the light guiding device 100 of the present invention comprises a solid light transmitting body 110 formed of sapphire, spinel or other robust material of a high refractive index provided between the capture surface 101 and a reflector 103 provided adjacent to the exit surface 102. In the embodiment shown, slabs of light transmitting material 104, 105 are provided covering the end faces 111, 112 of body 110 and thus providing the surfaces 101, 102. These slabs 104, 105 may be omitted if desired. The reflector 103 shown is in the form of a prism although other alternative forms of reflector may be provided. The body 110, prism, 103 and slabs 104, 105 may all be formed form the same material.

In order to only direct light rays in a desired manner, the exterior of the device 100 is coated by an opaque material or provided within an opaque housing (not shown), with the exception of the surfaces of 101, 102. Since the body 110 is formed from a robust material, it need not have an outer housing to provide it with structural integrity. As such, the device 100 can be narrower than prior art devices. Additionally, since the body 110 has a high refractive index, rays 150 emitted by projector 10 are readily refracted towards the elongate axis of body 110. This also helps to provide a narrower light guiding device 100 without losing image details.

The body 110 can be adapted to have a substantially similar cross-section to the projector 10. This further minimises the dimensions of the device 100. This is illustrated by FIG. 2b, which shows the footprints of light rays defining the edges of a typical projector screen in two alternative orientations.

Figure 3C:
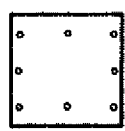
Figure 3A:
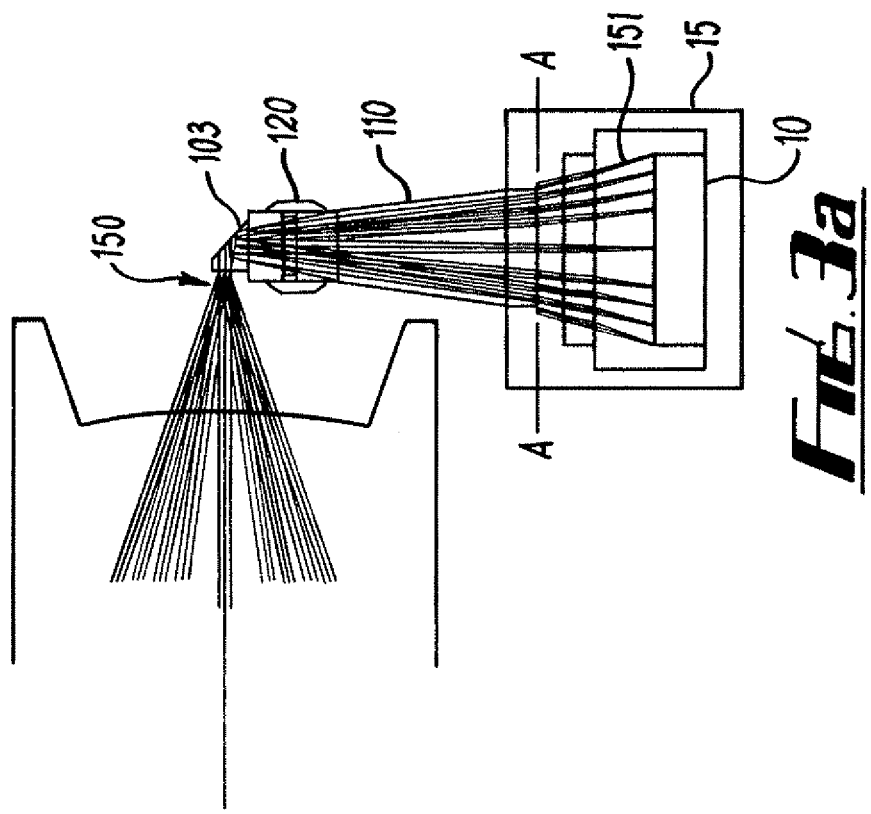
FIG. 3a is a schematic view of a second embodiment of a light guiding device according to the present invention illustrating example ray paths.

Turning now to FIGS. 3a-3c, an alternative embodiment of the light guiding device is shown. In this embodiment, the reflector 103 rather than being directly attached to the body 110 is attached thereto by a steel spacer sleeve 120. The steel spacer sleeve 120 reduces the difficulty of attaching the body 110 and reflector 103 by adhesive without stray adhesive adversely affecting the optical performance. Use of a steel spacer sleeve 120 can also improve the MTF (modulation transfer function) of the device 100 compared to embodiment of FIGS. 2a-2d. Unfortunately, the steel sleeve does have a trade off in that the structural integrity of the device 100 of FIGS. 3a-3c, whilst greater than that of prior art devices is typically less than that of the device of FIGS. 2a-2d.

A further possible feature illustrated in FIG. 3a is the integration of the projector 10 (in this example an OLED screen) with the light guiding device 110. In this example, a common housing 15 is provided around the projector 10 and the capture surface 101. This housing 15 can also provide a mask to prevent the passage of some off axis rays 151.

In order to improve the composite image observed by a user of the light receiving device 20, the operation of the projector can be controlled by a suitable control unit, typically a microprocessor. The microprocessor can be operable to vary the intensity of the light emitted by the projector. In one example, this variation can be in response to the ambient light level, as sensed by a suitable sensor. In this manner, the intensity of the light emitted by the projector 10 can be automatically reduced in low light conditions, helping to ensure that the projected light does not swamp the light incident on aperture 21.

An additional or alternative variation in projector emission intensity is to vary the intensity in a pulsed manner between a peak and a low level. Since the human eye is very sensitive to variation in incident light, this would provide a clear distinction between the projected components of a captured image and those components resulting from incident light. Furthermore, at times of low pulse intensity, components of the image formed from incident light would be particularly prominent. The pulses can be of a simple form. In a preferred embodiment, the pulse intensity rises rapidly over a first time period to a peak intensity then falls gradually to zero or to a low level. The intensity is then held at zero or a low level for a second time period until the pulse cycle begins again. In such an embodiment, the first and second time periods are typically of the order of seconds (say 3 seconds each) and the rise time is a fraction of a second.

Whilst the example shown relates to adding thermal imaging capacity to an image intensifier sight 20, the skilled man will be aware that the projector 10 may additionally or alternatively be adapted to project other data into a combined image. This might be alphanumerical data, perhaps indicating time/date, range, inclination, altitude, orders or other relevant information. In some embodiments, the light guiding device 100 may be connected to a laser rangefinder or similar. This can allow range textual information to be injected into an image viewable through a connected device such as a camera or similar without interfering with the camera's field of view. In still further embodiments, the light source 10 may not be a projector but may be another optical device, including but not limited to one comprising a suitable arrangement of mirrors, prisms and lenses.

The skilled man will also be aware that the device 100 may alternatively be fitted to any other optical device, for example a magnifying device such as a telescope or telescopic sight. This can thus enable the generation of other forms of composite image.

It is of course to be understood that the invention is not to be restricted to the details of the above embodiments which are described by way of example only.

What is claimed is:

1. A method of operating a thermal imaging attachment for an image intensifier having a light receiver,
   said thermal imaging attachment comprising a thermal imaging device operable to capture incident light and output a thermal image signal indicative thereof, a projector operable in response to said thermal image signal to project a thermal image indicative of said thermal image signal, a light guiding device adapted to receive said projected thermal image and guide it to an aperture of said light receiver of said image intensifier,
   said method comprising the steps of:
   overlaying said projected thermal image on a corresponding intensifier image created by said image intensifier to provide a composite image; and
   automatically and continuously pulsing an intensity of the projected thermal image in a predetermined form and at a predetermined frequency while a human observer is viewing the composite image, such that a human observer can readily identify the projected thermal image portion of the composite image.

2. The method of claim 1 wherein the pulse intensity rises rapidly over a first time period to a peak intensity then falls gradually to zero or a low level.

3. The method of claim 2 wherein the pulse intensity is held at zero or a low level for a second time period.

4. The method of claim 3, wherein the first and second time periods are of the order of a few seconds.

5. The method of claim 2, wherein the pulse intensity rises in a fraction of a second.

6. The method of claim 1 wherein the pulse intensity is user controlled.

7. A thermal imaging attachment for an image intensifier having a light receiver, said thermal imaging attachment comprising:
   a thermal imaging device operable to capture incident light and output a thermal image signal indicative thereof,
   a projector operable in response to said thermal image signal to project a thermal image indicative of said thermal image signal,
   a light guiding device adapted to receive said projected thermal image and guide it to an aperture of said light receiver of said image intensifier,
   said projected thermal image being overlaid on a corresponding intensifier image created by said image intensifier to provide a composite image; and
   a projector control unit operable wherein an intensity of the projected thermal image is automatically and continuously pulsed in a predetermined form and at a predetermined frequency while a human observer is viewing the composite image, such that the human observer can readily identify the projected thermal image portion of the composite image.

8. The thermal imaging attachment of claim 7 wherein the projector control is operable to rapidly increase the pulse intensity over a first time period to a peak intensity then gradually decrease the pulse intensity to zero or a low level.

9. The thermal imaging attachment of claim 8 wherein the pulse intensity is held at zero or a low level for a second time period.

10. The thermal imaging attachment of claim 9, wherein the first and second time periods are of the order of a few seconds.

11. The thermal imaging attachment of claim 8, wherein the pulse intensity rises in a fraction of a second.

12. The thermal imaging attachment of claim 7 wherein the pulse intensity is user controlled.

\* \* \* \* \*